United States Patent [19]

Ford, Jr.

[11] 4,228,469
[45] Oct. 14, 1980

[54] METHOD AND APPARATUS FOR TIME COMPRESSION OF FACSIMILE TRANSMISSIONS

[75] Inventor: Herbert P. Ford, Jr., Orlando, Fla.

[73] Assignee: Exxon Research & Engineering Co., Florham Park, N.J.

[21] Appl. No.: 682,025

[22] Filed: Apr. 30, 1976

Related U.S. Application Data

[63] Continuation of Ser. No. 449,514, Mar. 8, 1974, Pat. No. 3,955,045.

[51] Int. Cl.² .................... H04N 1/17; H04N 1/00
[52] U.S. Cl. .................................. 358/288; 358/260
[58] Field of Search ............... 358/260, 261, 264, 288, 358/137

[56] References Cited

U.S. PATENT DOCUMENTS

| 2,287,413 | 6/1942 | Bruce et al. | 358/288 |
| 3,128,338 | 4/1964 | Teacher et al. | 358/260 |
| 3,201,512 | 8/1965 | Mason et al. | 358/260 |
| 3,286,026 | 11/1966 | Groutman et al. | 358/260 |
| 3,448,207 | 6/1969 | Green | 358/260 |
| 3,670,099 | 6/1972 | Oliver | 358/288 |
| 3,919,464 | 11/1975 | Kondoh | 358/260 |
| 3,991,267 | 11/1976 | Beaudette | 358/260 |

FOREIGN PATENT DOCUMENTS

| 3920022 | 3/1960 | Japan | 358/288 |
| 47-370 | 1/1972 | Japan | 358/288 |

Primary Examiner—Robert L. Richardson
Assistant Examiner—Edward L. Coles
Attorney, Agent, or Firm—N. L. Norris

[57] ABSTRACT

In a facsimile transmission system, a transmitter comprises a read photodetector which scans a document for video content and a lead photodetector which scans the document in advance of the read photodetector. The output of the read photodetector is coupled to a modulator which generates signals for transmission to a facsimile receiver at a remote location. The output of the read photodetector and the lead photodetector are also coupled to timing circuitry which automatically initiates a fast scanning mode for the read and lead photodetectors after a predetermined time lapse without detection of a dark, information-bearing area on the document. The facsimile receiver which comprises a stylus for scanning a copy medium and a demodulator for controlling marking on the copy medium by the stylus also includes timing circuitry for automatically initiating a fast scanning mode after a predetermined lapse in time between received signals representing dark, information-bearing areas. The fast scanning modes at the transmitter and receiver are terminated in response to the first dark, information-bearing area detected by the read or lead photodetector.

2 Claims, 6 Drawing Figures

METHOD AND APPARATUS FOR TIME COMPRESSION OF FACSIMILE TRANSMISSIONS

This is a continuation of application Ser. No. 449,514, filed Mar. 8, 1974 U.S. Pat. 3,955,045.

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

Typically, the communications network comprises ordinary telephone lines which have a limited bandwidth capacity. In order to stay within this bandwidth capacity, the scan rate must be maintained so that the maximum frequency of light-dark variations is maintained within the bandwidth.

Heretofore, various line-skipping facsimile schemes have been proposed to permit a rapid facsimile transmission by utilizing a fast scanning rate over those portions of a document or image which are devoid of information. Systems of this type are disclosed in U.S. Pat. Nos. 3,286,026—Greutman et al, 3,128,338—Teacher et al and 2,287,413—Bruce et al. In the systems disclosed in these patents, separate and distinct signals are generated and transmitted to adjust the scanning rate of the document or image. Accordingly, a portion of the available bandwidth of the communications network must be utilized for scanning rate control. This in turn reduces the available bandwidth for transmission of the information-bearing signals unless a separate communications link is provided for scanning control. Moreover, such systems require initial additional circuitry for the transmission and reception of the separate and distinct scanning rate control signals.

U.S. Pat. Nos. 3,448,207—Green et al and 3,201,512—Mason et al disclose facsimile systems which are capable of operating at a fast scanning rate in response to the sensing of information voids by lead fiber optics positioned in advance of the read or video fiber optics which detect video information for transmission. In both the Green et al and Mason et al patents, fiber optics are spaced a good distance from and communicate with the document through lenses. If the fiber optics were to be placed in direct communication with the document as disclosed in copending application Ser. No. 412,989, filed Nov. 5, 1973 now U.S. Pat. No. 3,956,587, considerable difficulty might be encountered in distinguishing between shadows created by the edge of the document being scanned and/or the clamping mechanism utilized to hold the document in place. As set forth in the aforesaid copending application, the use of fiber optics in direct communication with a document is extremely advantageous from an economy standpoint in addition to producing a very high degree of facsimile resolution.

SUMMARY OF THE INVENTION

It is an object of this invention to provide an improved method and apparatus for reducing the time for transmission of signals from one location to another so as to produce a facsimile of a document.

It is a more specific object of this invention to reduce the facsimile transmission time by increasing the scanning rate at the transmitter and the receiver without generating scanning rate control signals which are separate and distinct from the information-bearing signals.

It is another object of this invention to provide for a reduced facsimile transmission time and in a relatively low cost, high resolution transmitter.

In accordance with these and other objects of this invention, the facsimile transmitter in a preferred embodiment of a facsimile system comprises optical sensor means in optical communication with a document for generating signals representing light and dark regions on the document. Signal transmitting means are coupled to the sensor means for generating transmission signals representing the sensing of the light and dark regions while scanning means move the optical sensor means relative to the document at a slow scanning rate and a fast scanning rate. Scanning rate control means are coupled to the optical sensor means and the scanning means for automatically initiating the fast scanning rate when the distance between the dark regions on the document exceeds a predetermined distance as sensed by optical sensor means and automatically reinstates the slow scanning rate when the optical sensor means senses a dark region. The signal transmitting means only generates a transmission signal representing the sensing of a light region for a period of time corresponding to the time elapsed in scanning predetermined distance as sensed by the optical sensor means and continues to generate a transmission signal representing the sensing of a light region during initiation of the fast scanning rate and thereafter until the optical sensor means senses a dark region whereupon the scanning rate control means reinstates the slow scanning rate.

The scanning rate control means may comprise timing means for determining the aforesaid period of time where the timing means is automatically reset in response to the sensing of a dark region on the document. In a particularly preferred embodiment, the timing means comprises detector means for detecting the sensing of a dark region on the document within a time frame, the signal transmitting means being coupled to the detector means so as to generate a transmission signal after the time frame representing the sensing of a dark region within the time frame. The timing means further comprises clock means coupled to the detector means for generating a series of clock pulses in synchronism with the scanning of the document where the period of the clock pulses in the series represents the time frame. RC circuitry may be coupled to the detector means where the RC circuitry charges and discharges in response to signals representing dark and light regions generated by the optical sensor means such that the state of charge and discharge of the RC circuitry represents the sensing or lack of sensing of a dark region in the time frame.

The transmitter may further comprise additional timing means coupled to the detector means and automatically reset at the end of the time frame in response to the sensing of a dark region on the document during the time frame. The additional timing automatically initiates a fast scanning rate at the end of the time frame in the absence of a dark region sensed in the time frame and automatically delays initiation of the fast scanning rate until the end of the next time frame in the presence of a dark region sensed during the preceding time frame. Where the transmitter is also provided with a receiving capability, the additional timing means is coupled to the receiving circuitry and utilized to measure the lapse in time between received signals representing dark regions of a document being scanned.

In accordance with one important aspect of the invention, the optical sensor means may comprise fiber optic sensor means in direct optical communication with the document and a drum for carryng the document including clamping means for holding the document in place. In order to prevent shadows created by the clamping means from erroneously maintaining the scanning means at a slow scanning rate, the scanning rate control means includes blanking means responsive to rotation of the drum for generating a blanking signal in synchronism with the passage of the clamping means past the fiber optic sensor means so as to permit the continuing generation of a transmission signal representing the sensing of light regions while the scanning means is scanning the fiber optic sensor means past the clamping means. In the preferred embodiment of the invention, the blanking signals are separated by a time lapse corresponding to the time elapsed in scanning the predetermined distance at the fast and slow scanning rates respectively. The blanking means may be actuated in response to the clock means so as to generate blanking signals simultaneously with the clock pulses.

In accordance with another important aspect of the invention, the fiber optic sensor means comprises read fiber optic means and lead fiber optic means appropriately positioned such that the lead fiber optic means scans the document in advance of the read fiber optic means. The lead fiber optic means is then coupled to the scanning control means so as to automatically maintain or reinstate the slow scanning rate when the lead fiber optic means generates a signal representing a dark region on the document.

DETAILED DESCRIPTION OF A PREFERRED EMBODIMENT

Figure 1:
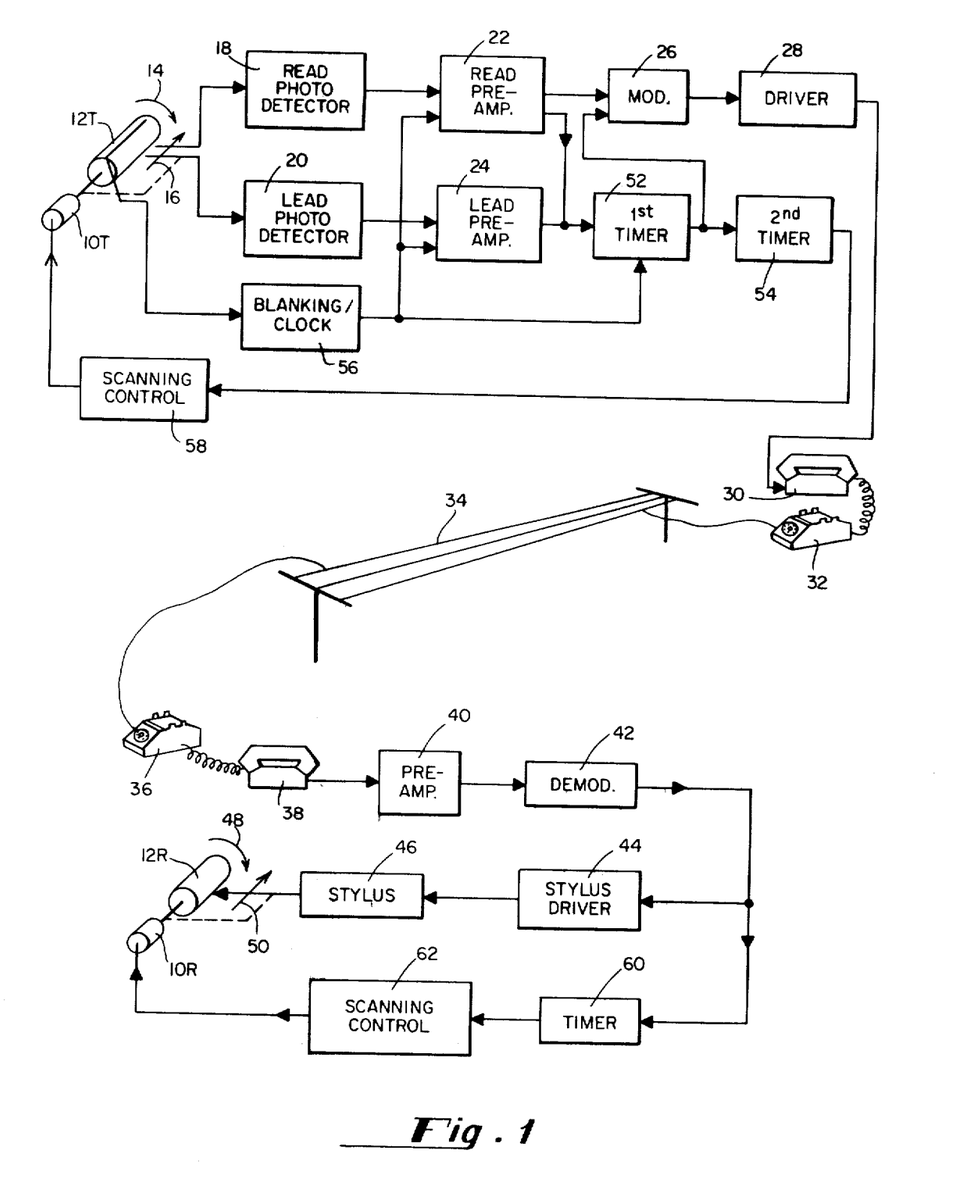
FIG. 1 is a block diagram of a facsimile system depicting a preferred embodiment of the invention.

Referring now to the facsimile system shown in FIG. 1, a facsimile transmitter comprises a drum 12T rotated by a motor 10T in the direction indicated by an arrow 14 so as to create a relative scanning movement between a document by the drum 12T and a scanning head not shown. As the scanning head is advanced axially along the drum 12T in the direction indicated by the arrow 16 and the drum rotates about its axis in the direction indicated by the arrow 14, successive paths on the document are illuminated and variations in light intensity due to the reflectivity and transmissivity of the document are detected by a read photodetector 18 and a lead photodetector 20. The photodetectors 18 and 20 convert these variations in light intensity into electrical signals and these signals are amplified by a read preamplifier 22 and a lead preamplifier 24. The output of the read preamplifier 22 is coupled to a suitable modulator such as a voltage controlled oscillator for creating frequency modulated signals which are applied to a driver 28 which is in turn coupled to an acoustical coupler 30 which is associated with a conventional telephone handset 32.

The frequency modulated signals representing the information content of the document mounted on the drum 12T may be transmitted by suitable means such as conventional telephone lines 34 to a facsimile receiver which is coupled to another conventional telephone handset 36 and an associated acoustical coupler 38. The receiver also includes a preamplifier 40 coupled to the input of a demodulator 42 having an output applied to a stylus driver 44. A stylus 46 is driven in response to the stylus driver 44 so as to mark the copy medium on a drum 12R which is rotated by a motor 10R in a direction indicated by an arrow 48 so as to create a scanning motion between a head not shown carrying the stylus 46 and the copy medium carried on the drum 10T. In addition, the head is moved axially along the drum so as to also create an axial scanning motion as indicated by the arrow 50.

In accordance with this invention, the scanning of the document at the transmitter and the scanning of the copy medium at the receiver proceeds at two different rates depending upon the presence or absence of information-bearing areas on the document. More particularly, the document on the drum 12T is scanned at a slow scanning rate when the distance between the dark information-bearing regions on the document is less than a predetermined distance as sensed by optical sensor means coupled to the read photodetector 18 and the lead photodetector 20. When the light space between the dark information-bearing areas exceeds a predetermined distance as sensed by the optical sensor means coupled to the read photodetector 18 and the lead photodetector 20, scanning proceeds at a fast scanning rate. Where substantial areas of the document are light and therefore void of information, rapid scanning over these areas allows the content of the document to be scanned in a relatively short period of time thereby accelerating the overall transmission time for the content of the document. By simultaneously controlling the scanning rates at the receiver, the information content on the copy mounted on the drum 12R will be an accurate facsimile of the information content on the document at the transmitter.

In order to provide this variable scanning rate capability without requiring the transmission of discrete scanning control signals, scanning rate control circuitry is provided including a first timing circuit 52 and a second or additional timing circuit 54. The first timing circuit measures the elapsed time between the sensing of dark regions on the document, which elapsed time corresponds to a predetermined distance as sensed by the read photodetector 18 and the lead photodetector 20. Each time the read photodetector 18 or the lead photodetector 20 senses a dark region, the first timing circuit 52 is reset.

The second timing circuit 54 is automatically reset by the first timing circuit 52 at the end of a time frame determined by the blanking/clock circuitry 56. If a dark region has been sensed in a time frame, the timing circuit 54 will be automatically reset so as to produce an output which will maintain the scanning control circuit 56 in a condition so as to drive the motor 10T at the slow scanning rate. If the first timing circuit 52 is not reset during the time frame, the scanning control circuit 58 will automatically initiate the fast scanning rate at the end of the time frame.

At the time the scanning control circuit initiates fast scanning and prior thereto, the modulator 26 generates a signal for transmission over the lines 34 which represents the sensing of a light region on the document. This signal continues to be transmitted by the modulator 26 and over the lines 34 to the receiver until the read photodetector 18 or the lead photodetector 20 senses a dark region at which time a signal representing the sensing of a dark region is transmitted over the lines 34. In this connection, note that the output of the first timer 52 is connected to the modulator 26 so as to assure that any dark region sensed by the lead photodetector 20 as well as any dark region sensed by the read photodetector 18 will be effective to produce a modulated signal representing a dark region.

As mentioned previously, it is necessary that the scanning rate of the receiver be controlled identically with that of the transmitter if the information voids on the document at the transmitter are to be reproduced accurately at the receiver. In this connection, a timer circuit 60 is provided in the receiver which is substantially identical to or the same as the second timer circuit 54. As long as the first timer circuit 52 is sensing a dark region in the time frame between the blanking signals or clock pulses and resetting the second timer 54, the modulator 26 will be producing a signal at the end of each time frame representing a sensing of a dark region and that signal is transmitted to the receiver for demodulation by the demodulator 42 to reset the timer 60.

As long as the timer 60 is continually reset at sufficiently frequent intervals so as not to time out the predetermined time lapse between dark signals, the scanning control means 62 maintain the motor 10R in the slow scanning state. If the first timer 52 of the transmitter fails to receive a signal from the read preamplifier 22 or the lead preamplifier 24 fails to generate a signal representing the sensing of a dark region and thereby fails to reset the first timer 52 within the period of time elapsed between clock pulses, the modulator 26 will generate a signal representing the sensing of a light region for transmission to the receiver which, after demodulation by the demodulator 42, will fail to reset the timer 60 and initiate the fast scanning rate through the scanning control 62.

It will therefore be appreciated that the only signals which are transmitted to a receiver are light and dark signals representing the information in a document at the transmitter, and these signals themselves are utilized to control the scanning rate at the receiver.

Portions of the specific circuitry depicted by block diagram in FIG. 1 will now be described in detail with respect to FIG. 2. The read preamplifier 22 and the lead preamplifier 24 comprise operational amplifiers 102 and 104 which are coupled to clamping circuits 106 and 108 through field effect transistors 110 and 112. Each of the clamping circuits 106 and 108 includes a diode 114 connected between ground and the coupling resistor 110 or 112. When the output of the amplifiers 102 and 104 go negative, the diodes 114 of the clamping circuits 106 and 108 are forward biased so as to clamp the junction of 116 and the diode 114 and the resistor 110 or 112 to ground.

The clamping circuits 106 and 108 are also provided with a transistor 118 connected in a grounded collector configuration with the emitter coupled to the junction 116. Biasing resistors 120 connect the emitter and base to the power supply B. By appropriately adjusting the bias on the base of the transistor 118 by means of a potentiometer 122, the transistor 118 will operate in a region of its characteristic such that the junction 116 connected to the emitter will be maintained substantially constant so as to assure a clamped white level in spite of variations in the white level output from the operational amplifiers 102 and 104.

By clamping dark signals to a predetermined level and light signals to a predetermined level, the output of the read preamplifier 22 and the lead preamplifier 24 which is applied through resistors 124 and 126 to the first timer circuit 52 is maintained constant for all dark signals and light signals respectively. This assures that, in accordance with this invention, the various degrees of dark and light as sensed by the read photodetector 18 and lead photodetector 20 as shown in FIG. 1 will reset the timer circuit 52 without regard to the degree of blackness sensed. Similarly, light signals generated as the result of sensing various degrees of white will uniformly fail to reset the first timer circuit 52. This clamping produces certainty in the resetting of the timer circuits 52 and 54 of the transmitter as well as the timer circuit 60 of the receiver so as to prevent erroneous changes in the fast scanning mode as well as the slow scanning mode to assure that changes from one mode to another at the transmitter results in an identical change in modes at the receiver.

The first timer circuit 52 will now be described in somewhat more detail with respect to FIG. 2. As shown, a pair of transistors 128 and 130 are connected at their emitters with their bases coupled to resistors 124 and 126 of the preamplifiers 22 and 24. In this configuration with their collectors connected to ground through a resistor 133, transistors 128 and 130 act as an OR gate for controlling the charging of a capacitor 132 connected to one input terminal of a detector comprising a comparator 134. When a dark signal is detected, the level of charge on the capacitor 132 is sufficient to produce an output from the comparator 134 so as to apply a bias to the transistor 136 through a resistor 138 which saturates the transistor 136 thereby maintaining the collector of the transistor 136 at ground. When a negative going clock pulse is applied to the base of the transistor 136 from the blanking/clock pulse generator 56, the transistor 136 becomes nonconductive so as to generate a pulse at the collector of the transistor 136. Parallel capacitors 140 which are connected to ground through a diode 142 and a resistor 144 differentiate the pulse generated at the output of the resistor 136 thereby shortening the pulse and producing a momentary pulse which is utilized to reset the second timing circuit 54. In the absence of a signal representing a dark region, neither the transistor 128 nor the transistor 130 will conduct and the terminal of the comparator 134 connected to the timing capacitor 132 will not become sufficiently positive so as to generate an output signal sufficient to bias the transistor 136 into saturation. As a result, the blanking pulse from the blanking/clock pulse generator 56 will not produce a pulse from the timer circuit 52 for application to the second timer circuit.

Figure 2:
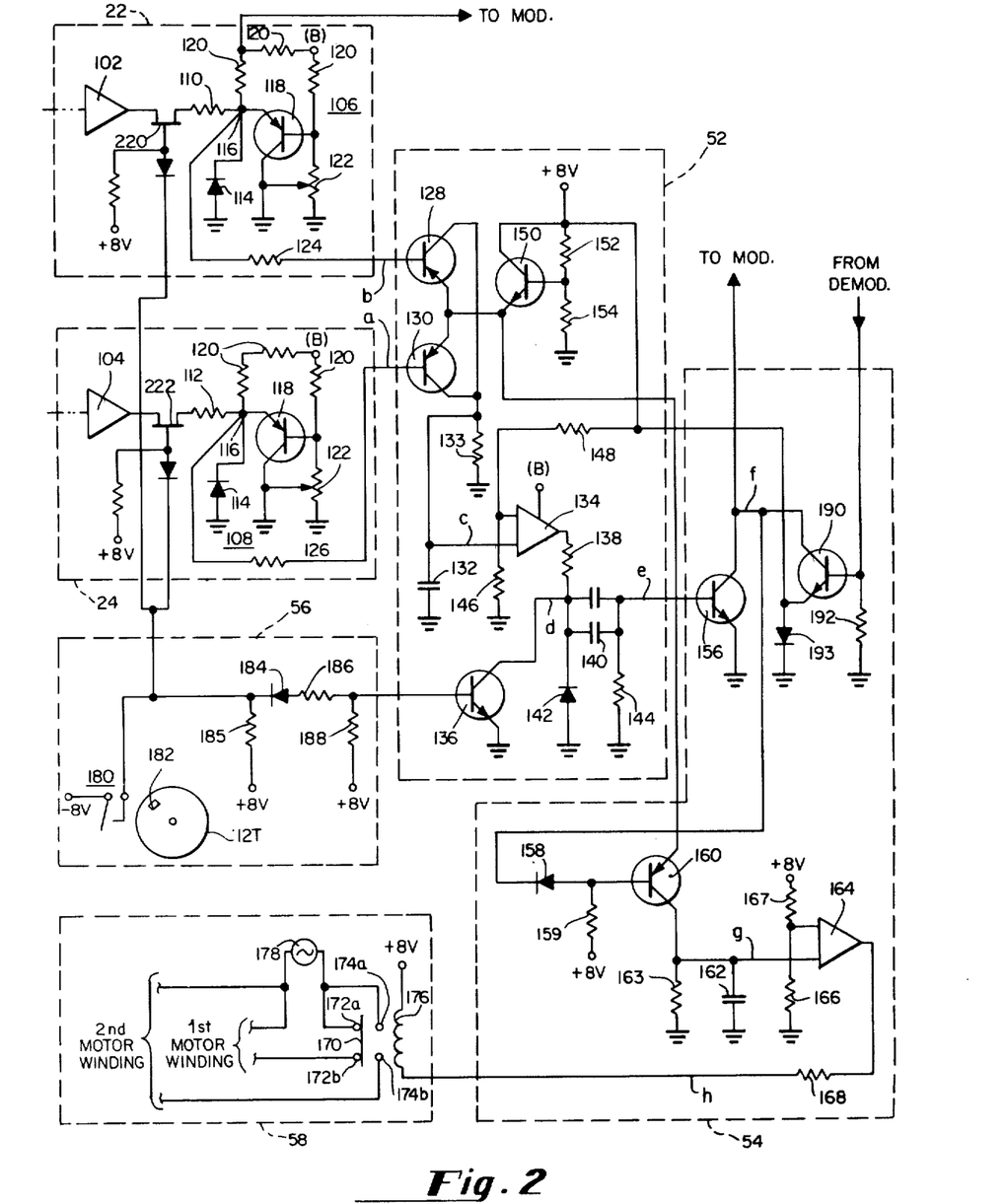
FIG. 2 is a schematic circuit diagram of portions of a facsimile transceiver for controlling the scanning rate of the transceiver.

As shown in FIG. 2, the input terminal of the comparator 134 which is not connected to the timing capacitor 132 is maintained at an appropriate bias by a voltage dividing network including resistors 144 and 146 which are connected to a +8 volt power supply. A transistor 150 having a base connected to a voltage divider circuit including resistors 152 and 154 provide a low impedance power supply for appropriate biasing of the emitters of the transistors 128 and 130.

The second or additional timing circuit 54 comprises a transistor 156 having a base connected to the output of the differentiating capacitor 140. When a pulse is generated at the output of the differentiating capacitors 140 of the first timer circuit 42 signifying the detection of a dark signal between blanking or clock pulses, the transistor 156 is momentarily saturated so as to apply a signal through a diode 158 to the base of a transistor 160 and a resistor 159 connected to the +8 volt power supply so as to saturate the transistor 160 which applies its collector current through the parallel RC combination including a capacitor 162 and a resistor 163 which are connected to an input terminal of a comparator 164. As in the case of the capacitor 132, the capacitor 162 also charges to a sufficient level in response to saturation of the transistor 160 so as to generate a positive output from the comparator 164. The other input terminal of the comparator 164 is maintained at a predetermined potential by means of a voltage divider comprised of resistor 166 and resistor 167 which is connected to a +8 volt power supply. A resistor 168 couples the output from the comparator to the scanning control circuitry 58 so as to continue or initiate the slow scanning mode. By appropriately choosing the value of the resistor 163 and capacitor 162, the charge on the capacitor 162 will reach a sufficient level in the absence of an output pulse from the first timing circuit so as to initiate the slow scanning mode by producing a less positive output from the comparator.

The scanning control circuit 58 as shown in FIG. 2 may comprise switching means which selectively apply a suitable source 178 of power such as 110 volts to two different windings of the motor 10T (not shown in FIG. 2). In the position shown in FIG. 2, the output of the comparator 164 is sufficiently positive so as to maintain the contact member 170 of the switch in contact with terminals 172 (a & b) so as to connect the power supply 178 to a first winding of the motor 10T which will result in the slow scanning mode of operation. When the output from the comparator 164 becomes less positive indicating the absence of dark regions on the document, the member 170 will move to a position of contact with terminals 174 (a & b) in response to current flow through a coil 176 so as to apply the voltage from the source 178 across a second winding of the motor 10T.

As also shown in FIG. 2, the blanking/clock pulse generator 56 comprises a switch 180 having a movable contact connected to a −8 volt power supply. The switch 180 is closed in response to rotation of the drum 12T by means of a magnetic member 182 attached to the drum. The negative pulse generated by the closing of the switch 180 forward biases a diode 184 (normally reverse biased by a resistor 185) so as to apply a negative voltage through a resistor 186 to the base of the transistor 136 which produces a pulse which is differentiated by the capacitors 140 and the resistor 144. When the switch 180 is opened, a positive voltage from the +8 source is supplied to the base of the transistor 136 through a resistor 188.

The circuitry of FIG. 2 which has been described up to this point is transmitter circuitry. It is possible and indeed desirable to combine this transmitter circuitry with circuitry capable of performing a receiving function so as to provide a transceiver with a transmitting and receiving capability. In such a transceiver, the preamplifier 40, the demodulator 42, the stylus driver 44 and the stylus 46 would be provided. By providing a slight addition to the second or additional timing circuit 54, the scanning of a copy medium at the transceiver when operating in a receiving mode is controlled in synchronism with a like transmitting transceiver. This addition to the circuitry involves a transistor 190 having a base connected to the output of the demodulator 42 and ground through a resistor 192 and an emitter connected to the +8 volt power supply and ground through a diode 193. When the signal generated by the demodulator represents the transmission of a signal created by the short pulse coincident with the generation of a blanking or clock pulse when a dark region has been detected since the last blanking or clock pulse, the transistor 190 is rendered momentarily conductive and this in turn saturates transistor 160 so as to charge the capacitor 162 thereby continuing the drum of the transceiver in the slow scanning mode. However, if the receiving circuitry of the transceiver does not receive a signal representing the sensing of a dark region at the transmitter within the time it takes for the capacitor 162 to discharge to a sufficiently low level, the output of the comparator 164 will initiate the fast scanning mode. Assuming identical circuitry at the transmitting transceiver, the fast scanning mode at the transmitting transceiver will be initiated simultaneously since the charge on the transmitting capacitor 162 is always identical to the charge on the receiving capacitor 162.

Reference will now be made to the waveforms of FIG. 3. Waveforms a and b represent the inputs to the first timing circuit 52 from the read preamplifier 22 and the lead preamplifier 24 respectively. In a time lapse between $t_0$ and $t_1$ which represents the time frame between clock pulses when the transceiver is operating in the normal scanning mode, two dark regions are detected by the photodetector 18 coupled to the read preamplifier 22. In the same period of time, the waveform b indicates detection of one dark region by the lead photodetector 20. The detection of dark regions on the document by the read photodetector 18 and the lead photodetector 20 in the time frames $t_1$-$t_2$ and $t_2$-$t_3$ respectively are also depicted by waveforms a and b. Note that no dark regions are detected by either the read photodetector 18 or the lead photodetector 20 in the time frame $t_3$-$t_4$.

When the bases of the transistors 128 and 130 are driven less positive by the pulses depicted in waveforms a and b, the transistors 128 and 130 conduct and this in turn charges the capacitor 132 as depicted by waveform c. It will be seen that the capacitor 132 remains charged near the maximum value during the first time frame $t_0$-$t_1$ by the repeated detection of dark regions on the document. In the second time frame $t_1$-$t_2$, the capacitor 132 begins to discharge but is again charged back to the maximum value approximately midway through the time frame. In the third time frame $t_2$-$t_3$, a dark regions is detected by the read detector 18 so as to again charge the capacitor 132 to the maximum value. In the time frame t₃-t₄, there are no dark regions detected by the read photodetector 18 or the lead photodetector 20 and this allows the charge across the capacitor 132 to reach a sufficiently low level at the comparator 134 so as to switch from the positive value as depicted by waveform d throughout the time frames in the period $t_0-t_3$ to a zero value in the time frame $t_3-t_4$.

Note that while the output from the comparator 134 was positive, the blanking pulses which were applied to the base of the transistor 136 produced positive going pulses at the base of the transistor 156 as depicted by waveform e. When the output of the comparator 134 went to zero, the clock pulses no longer produced the short pulses at the base of transistor 156 and this in turn terminated the application of the pulses, as depicted by the waveform f, to the base of the transistor 160. When the pulses of the waveform f are applied to the transistor 160, the capacitor 162 is repeatedly charged to its maximum value. With the termination of the pulses in the waveform f, the charge on the capacitor 162 is diminished to the point of producing a zero output from the comparator 164 which occurs at the end of the time frame $t_3-t_4$ so as to initiate the fast scanning mode.

The fast scanning mode continues until the read or lead photodetector 18 or 20 senses a dark region on the document. This initial sensing of the dark region as shown in waveform f of FIG. 3 is performed by the lead detector 20 and occurs some seven revolutions after initiation of the fast scanning mode. Note that this immediately charges the capacitor 132 to its maximum value as depicted by waveform c so as to produce a positive output from the detector comparator 134 as depicted by waveform d. However, the actual initiation of the slow scanning mode is delayed until the next clock pulse which is supplied to the base of the transistor 136 so as to produce a pulse at the input to the amplifier 156 as depicted by waveform e. Simultaneously, a pulse in the waveform f is supplied to the base of 160 which in turn charges the capacitor 162 to its maximum level thereby producing a positive output from the comparator 164 so as to reinitiate the slow scanning mode.

Figure 3:
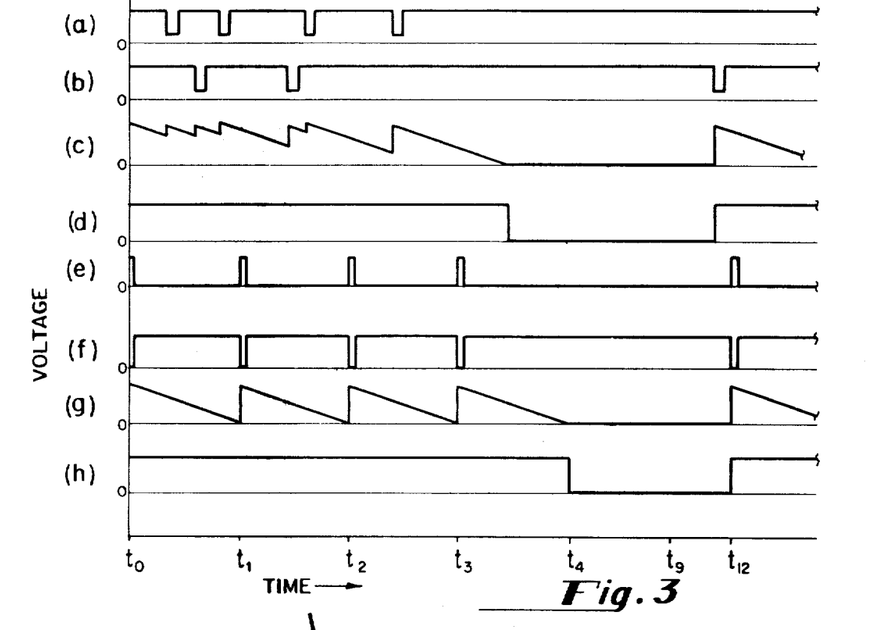
FIG. 3 is a waveform diagram depicting signals generated at various points in the schematic circuit diagram of FIG. 2.

As shown in FIG. 3, it has been assumed that the fast scanning rate is five times as fast as the slow scanning rate so that the period between $t_4$ and $t_9$ represents five revolutions of the drum while the period between $t_3$ and $t_4$ represents a single revolution of the drum.

It will of course be appreciated that, when the transceiver of FIG. 2 is utilized in the receiving mode, a pulse similar to the pulse at time $t_{12}$ in waveform e is applied to the base of the transistor 190. This in turn will produce a pulse similar to that of time $t_{12}$ and waveform f at the collector of the transistor 190 so as to saturate the transistor 160 and charge the capacitor 162 to the maximum value. This will then reinitiate the slow scanning mode at the receiving transceiver. It will therefore be seen that reinitiation of the slow scanning mode occurs substantially simultaneously at a receiving transceiver and a transmitting transceiver without benefit of any separate, discrete scanning control signals.

Figure 4:
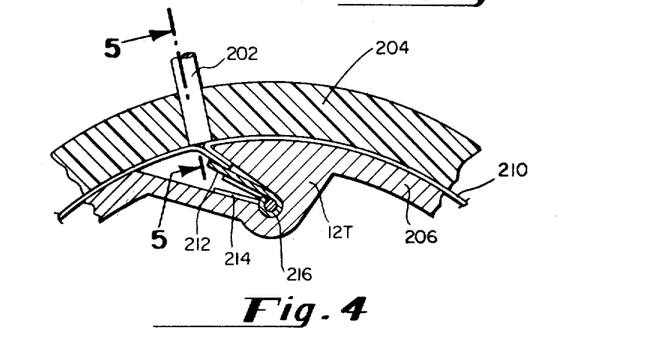
FIG. 4 is a partial cross-sectional view of a scanning head juxtaposed to a document-carrying drum of a facsimile transmitter.
Figure 5:
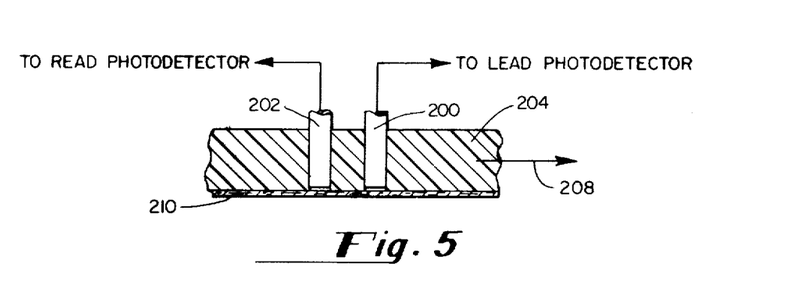
FIG. 5 is a sectional view of the head and document of FIG. 4 taken along lines 5-5.
Figure 6:
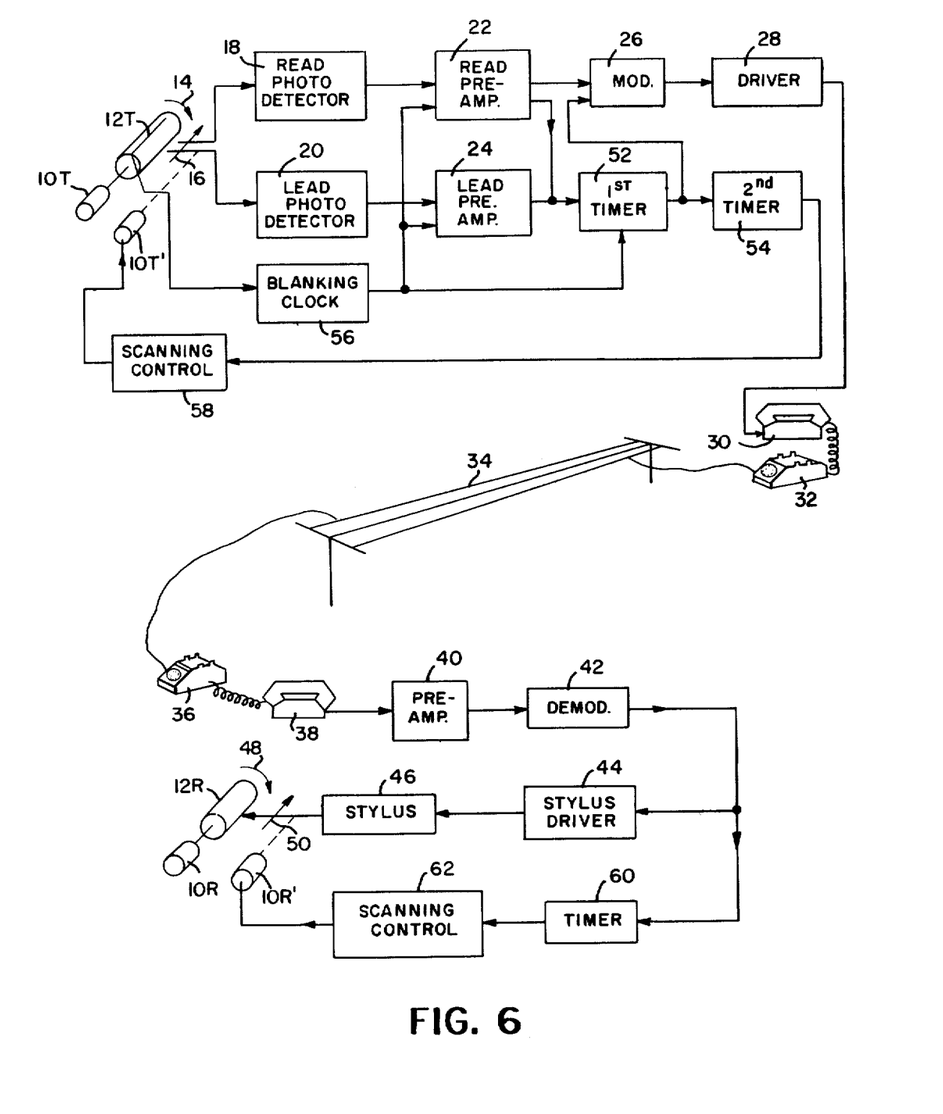
FIG. 6 is a block diagram of a facsimile system depicting another embodiment of the invention.

In accordance with one important aspect of the invention, the optical sensor means comprise fiber optics in direct optical communication with the document carried by the drum 12T. Referring to FIGS. 4 and 5, the fiber optic means comprises a lead fiber optic 200 and a read fiber optic 202 which extend through a movable head 204 having a face 206 generally conforming with the surface of the drum 12T as shown in copending application Ser. No. 412,989, filed Nov. 5, 1973 now U.S. Pat. No. 3,956,587 assigned to the assignee of this invention. The fiber optics 200 and 202 are positioned with respect to one another such that the fiber optic 200 scans in advance of the fiber optic 202 as depicted in FIG. 5 where an arrow 208 depicts the direction of movement of the head 204 with respect to the document 210.

As shown in FIG. 4, the document 210 is held in place on the drum 12T by a clamp 212 which is spring biased to the closed position by a spring 214 mounted on a shaft 216. The overlap of the document 210 at the clamp 212 will result in a shadow which will be detected by the read and lead fibers 200 and 202. In order to avoid the erroneous reinitiation of a slow scanning mode upon detection of the shadow at the area of the clamp, blanking is provided by the switch 180 in conjunction with the magnetic actuating means 182 on the drum 12T as shown in FIG. 2.

As also shown in FIG. 2, blanking is accomplished by applying a negative voltage resulting from closure of the switch 180 to field effect transistors 220 and 222 in the output of the operational amplifiers 102 and 104 of the read preamplifier 22 and the lead preamplifier 24. This assures that the signals depicted by the waveforms a and b are maintained at the white level at the end of the time frames $t_0-t_1$, $t_1-t_2$, $t_2-t_3$, etc.

It will be appreciated that the spacing of the fiber optics 200 and 202 is of considerable importance. The spacing between the fiber optics must be sufficiently small so as to avoid reinitiation of the fast scanning rate before the read fiber optic 202 encounters the dark information-bearing areas of the document. At the same time, however, the spacing between the fiber optics must be sufficiently large so as to allow ample time for the stabilization of the slow scanning rate after initial sensing of a dark region by the lead fiber optic 200.

As shown in FIGS. 4 and 5, the fiber optics 200 and 202 are shown individually as a single element. Actually, the element 200 and 202 represents a bundle of fiber optics including at least one fiber optic for illumination of the material on the document 210 and at least another fiber optic connected to a photodetecting element such as a photodiode. Preferably, each bundle 200 and 202 includes a central fiber optic connected to a photodiode and a plurality of peripheral fiber optics which are connected to a light source. These and other details concerning the spacing of the fiber optic ends from the document being scanned or set forth in detail in the aforesaid copending application which is incorporated herein by reference.

Reference has been made to modulator 26 and a demodulator 42 without specifying the circuit details. Generally, it would be preferred to frequency modulate the signals. In such a case the modulator 26 may comprise a voltage controlled oscillator and the demodulator 42 may comprise a single shot detector such as those disclosed in copending application Ser. No. 449,514, filed Mar. 8, 1974, now U.S. Pat. No. 3,955,045 assigned to the assignee of this invention), which application is incorporated herein by reference. Other details concerning the full read preamplifier 22 and the lead preamplifier 24 are described in the last-mentioned application.

In accordance with one important aspect of the invention, the blanking pulses which are utilized to mask the effect of the clamp passing the fiber optics are also utilized in timing the distance between dark regions on the document. Further, the blanking or clock pulses are utilized to achieve synchronization in the initiation of the fast and slow scanning rates.

In many instances, it may be desirable to provide a separate motor 10T' and 10R' for moving the head carrying the fiber optics or the stylus axially along the drums 12T and 12R in the direction of the arrows 16 and 50. In such an arrangement, the scanning controls 58 and 62 control the speed through the use of separate windings for such head motors. In the alternative, two separate motors may be provided for each head, one of which advances the head at the slow scanning rate. The other motor drives the head at the fast scanning rate. By providing a mechanical coupling drive, the slow scanning motor may be run continuously while the first scanning motor is run during operation in the time compression mode producing slippage in the belt coupling between the slow scanning motor and the head.

As depicted in FIG. 3, the absence of detection of a dark region after scanning a distance equal to the circumference of the drum will initiate the fast scanning rate if the failure to detect a dark region occurs within the time frame between blanking or clock pulses. In other words, it is possible in the embodiment heretofore described that the distance between detected dark regions may represent more than one full revolution of the drum. The time elapsed between detection may represent more than the period between clock pulses. Thus it is possible for dark regions to be separated by a distance equal to the distance scanned by almost two revolutions of the drum without initiating the fast scanning rate as long as dark regions are detected in successive time frames. It will of course be appreciated that the distance scanned before initiation of the fast scanning rate is arbitrary. Furthermore, that distance may represent more than two revolutions of the drum or it may represent a mere fraction of a revolution.

Although a particular embodiment of the invention has been shown and described and various modifications have been suggested, it will be understood that the true spirit and scope of the invention as set forth in the appended claims embrace other modifications and embodiments which will occur to those of ordinary skill in the art.

What is claimed is:

1. A facsimile receiver for receiving signals representing dark-light variations in a document at a remote location, said receiver comprising:
   writing means for marking a copy medium;
   signal receiving means coupled to said writing means for generating information signals for actuating said writing means to mark said copy medium when signals representing dark regions are received;
   receiver scanning means for moving said document relative to said writing means in two substantially orthogonal directions at a slow scanning rate and a fast scanning rate; and
   receiver scanning control means coupled to said signal receiving means and responsive to the video density of said information signals for actuating said writing means for automatically initiating said fast scanning rate in both said directions when said information signals represent low video density and initiating said slow scanning rate in both said directions when said information signals represent high video density.

2. A facsimile transmitter for transmitting signals representing dark and light regions on a document at the transmitter, said transmitter comprising:
   sensor means for sensing dark regions on the document of varying density;
   scanning means for moving said sensor means relative to said document in two substantially orthogonal directions at a fast scanning rate and a slow scanning rate;
   transmitting means coupled to said sensor means for generating information signals representing each dark region on the document sensed by the sensor means, said information signals adapted to actuate writing means at a facsimile receiver; and
   scanning rate control means responsive to the video density of said information signals for initiating a fast scanning rate in both directions when low video density is sensed by said sensor means and initiating a slow scanning rate in both directions when high video density is sensed.

* * * * *